US012787937B2

(12) United States Patent
Rohde-Fölling et al.

(10) Patent No.: US 12,787,937 B2
(45) Date of Patent: Nov. 10, 2026

(54) SELF-PROPELLED HARVESTER

(71) Applicant: CLAAS Selbstfahrende Erntemaschinen GmbH, Harsewinkel (DE)

(72) Inventors: Marcel Rohde-Fölling, Harsewinkel (DE); Christian König, Oberteuringen (DE); Josef Fischer, Mettenberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 390 days.

(21) Appl. No.: 18/510,866

(22) Filed: Nov. 16, 2023

(65) Prior Publication Data

US 2024/0155976 A1 May 16, 2024

(30) Foreign Application Priority Data

Nov. 16, 2022 (DE) ........................ 102022130291.1

(51) Int. Cl.
*A01D 69/03* (2006.01)

(52) U.S. Cl.
CPC .................................. *A01D 69/03* (2013.01)

(58) Field of Classification Search
CPC ... A01D 69/03; A01D 41/142; A01D 41/1274
USPC .......................................................... 701/50
See application file for complete search history.

(56) References Cited

U.S. PATENT DOCUMENTS

| | | | | |
|---|---|---|---|---|
| 8,781,694 B1 * | 7/2014 | Sheidler | A01D 41/1274 | 56/11.1 |
| 2003/0163286 A1 * | 8/2003 | Yasugi | B23Q 17/0957 | 702/185 |
| 2004/0040276 A1 * | 3/2004 | Allworden | A01D 41/141 | 56/10.2 R |
| 2010/0107584 A1 * | 5/2010 | Sheidler | F16H 61/472 | 701/50 |

(Continued)

FOREIGN PATENT DOCUMENTS

| | | |
|---|---|---|
| DE | 102017201701 A1 | 8/2018 |
| EP | 3000306 A1 | 3/2016 |
| EP | 3348131 A1 | 7/2018 |

OTHER PUBLICATIONS

European Search Report for EP Application No. 23197935.2-1105 mailed Mar. 26, 2024.

*Primary Examiner* — Tuan C To
*Assistant Examiner* — Dominick Mulder
(74) *Attorney, Agent, or Firm* — Lempia Summerfield Katz LLC

(57) ABSTRACT

A self-propelled harvester is disclosed. The harvester comprises a drive motor, an attachment drive that has a hydraulic pump configured to drive a hydraulic motor to drive an attachment positioned on a feed device of the harvester, and a control device. The control device controls the attachment drive by accessing an attachment-specific parameter set tailored to the attachment that is connected to the harvester so that the hydraulic motor generates an attachment-specific operating torque which is lower than a maximum torque specific to the attachment to be driven. Further, the control device is configured, when a load peak is detected, to control the hydraulic motor to increase the operating torque generated by the hydraulic motor up to the attachment-specific maximum torque by changing a preset pivot angle.

20 Claims, 4 Drawing Sheets

(56) References Cited

U.S. PATENT DOCUMENTS

| | | | | |
|---|---|---|---|---|
| 2011/0209452 | A1* | 9/2011 | Goering | A01M 7/0042 239/722 |
| 2012/0296532 | A1* | 11/2012 | Murakami | F02D 41/021 701/50 |
| 2013/0179043 | A1* | 7/2013 | Byttebier | B60W 10/06 701/50 |
| 2014/0138166 | A1* | 5/2014 | Otto | B62D 11/04 180/6.48 |
| 2016/0193916 | A1* | 7/2016 | Kassube | B60K 17/354 74/664 |
| 2017/0152789 | A1* | 6/2017 | Benevelli | F01P 5/04 |
| 2017/0198809 | A1* | 7/2017 | Omran | F16H 61/0204 |
| 2017/0227945 | A1* | 8/2017 | Wang | G05B 19/182 |
| 2017/0231155 | A1* | 8/2017 | Duquesne | A01D 41/1273 460/4 |
| 2018/0192590 | A1 | 7/2018 | Trowbridge | |
| 2018/0213721 | A1 | 8/2018 | Schmoening et al. | |
| 2018/0298586 | A1* | 10/2018 | Tsukamoto | E02F 9/2285 |
| 2018/0319422 | A1* | 11/2018 | Polmans | B62D 6/008 |
| 2020/0272153 | A1* | 8/2020 | Ebertseder | A01C 21/00 |
| 2021/0235621 | A1* | 8/2021 | Pankaj | A01D 41/1274 |
| 2021/0337735 | A1 | 11/2021 | Schiewer et al. | |
| 2022/0002978 | A1* | 1/2022 | Kurosawa | G06V 10/82 |
| 2022/0039319 | A1* | 2/2022 | Sheidler | A01D 41/1274 |
| 2023/0202288 | A1* | 6/2023 | Kirchmair | B60K 1/04 180/308 |

* cited by examiner

SELF-PROPELLED HARVESTER

CROSS REFERENCE TO RELATED APPLICATION

This application claims priority under 35 U.S.C. § 119 to German Patent Application No. DE 102022130291.1 filed Nov. 16, 2022, the entire disclosure of which is hereby incorporated by reference herein.

TECHNICAL FIELD

The present invention relates to a self-propelled harvester, such as a forage harvester.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

US Patent Application Publication No. 2021/0337735 A1, incorporated by reference herein in its entirety, discloses a self-propelled harvester that comprises a drive motor and an attachment drive which is driven by the drive motor and has at least one hydraulic pump. The hydraulic pump is configured to drive a hydraulic motor for driving an attachment arranged or positioned on a feed device of the harvester.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
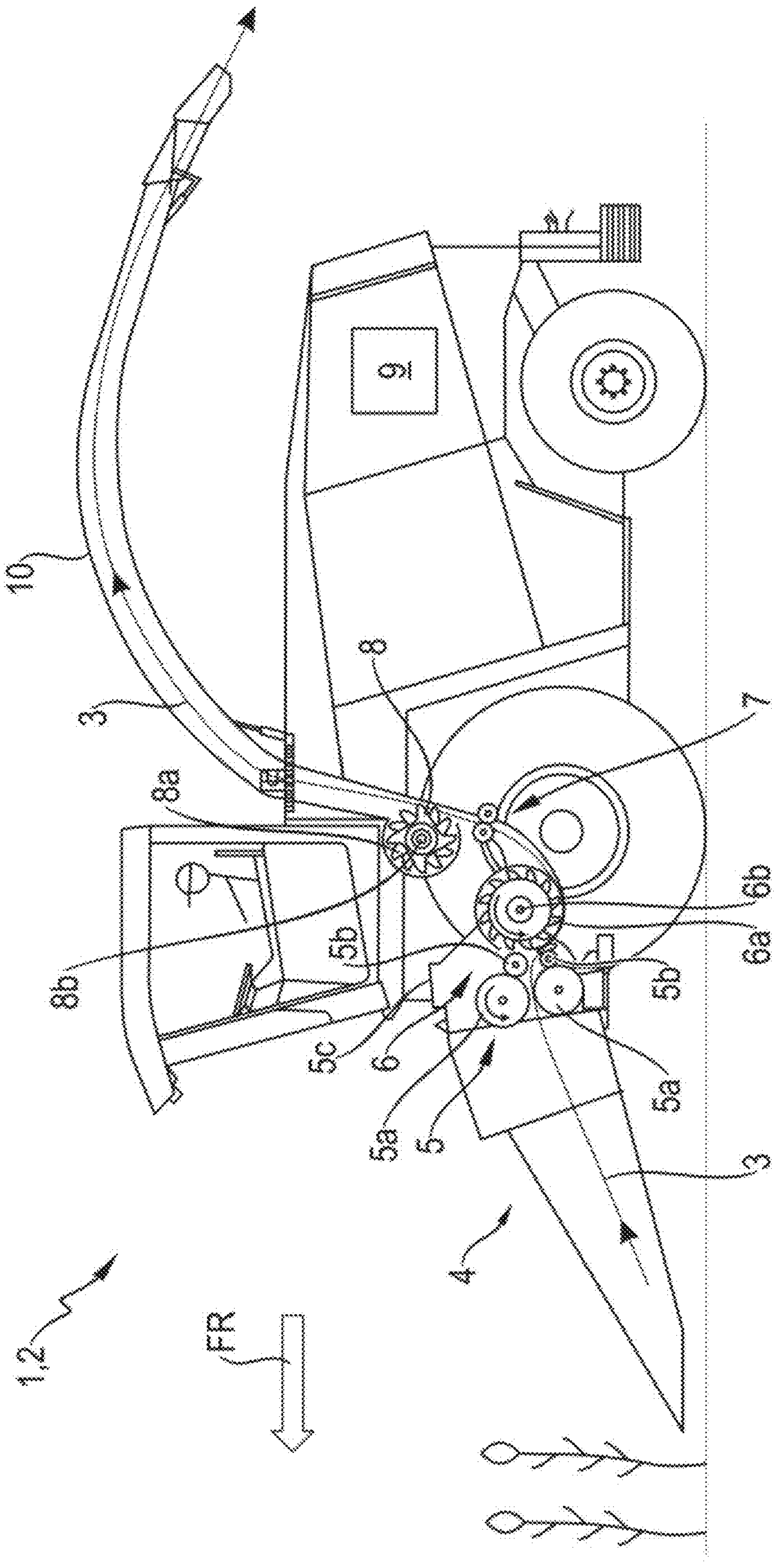
FIG. 1 illustrates a schematic view of a self-propelled harvester with attachment.

Self-propelled harvesters, such as forage harvesters, may be operated with different types of attachments, which may differ from one another, inter alia, in terms of any one, any combination, or all of their maximum permissible operating torque, operation with constant or variable speed, or their drive rotation direction.

For example, since the different types of attachments (interchangeably termed attachment devices) are to be operated at different maximum permissible torques, it may be necessary and customary to equip each attachment with its own overload clutch and a gearbox for limiting and setting the permissible torque and the required speed.

As such, in one or some embodiments, a self-propelled harvester is disclosed which is configured to enable operation adapted to the different requirements of various types of attachments. This may be accomplished by a self-propelled harvester that includes a drive motor and an attachment drive which has at least one hydraulic pump. The at least one hydraulic pump may be configured to drive a hydraulic motor for driving an attachment arranged or positioned on a feed device of the harvester. According to one or some embodiments, the harvester comprises a control device for controlling the attachment drive, wherein the control device is configured to control the hydraulic motor depending on an attachment-specific parameter set, which may be saved in (and/or accessible by) the control device so that the hydraulic motor generates an attachment-specific operating torque which may be lower than a maximum torque specific to the attachment to be driven. In this regard, the attachment-specific parameter set, tailored to the attachment that is connected to the harvester, may be used to tailor the control device's control of the attachment (e.g., so that the hydraulic motor generates an attachment-specific operating torque which is lower than a maximum torque specific to the attachment to be driven). The control device may be configured, responsive to the control device detecting (or being informed of) a load peak, to control the hydraulic motor in order to increase the operating torque generated by the hydraulic motor up to the attachment-specific maximum torque by changing a preset swivel angle. In this way, the attachment drive may be operated at an efficient operating point of the hydraulic motor, but the available power reserve (e.g., the difference between the operating torque and the attachment-specific maximum torque with priority for a stable crop flow) may be called up or accessed, such as at any time.

In particular, the control device may be configured to operate the hydraulic motor in an efficiency mode, wherein the control device is configured to automatically determine the pivoting angle of the hydraulic motor preset in the efficiency mode according to a load spectrum depending on the type of mounted attachment (which may be determined by the control device automatically or determined based on operator input) and an operating speed specific to the attachment. In efficiency mode, the hydraulic motor may be operated at an efficient operating point depending on the attachment to be driven.

Furthermore, the hydraulic pump and the hydraulic motor may be arranged or positioned in a closed hydraulic circuit, wherein the hydraulic pump and the hydraulic motor are connected to one another in a fluid-conducting manner by two hydraulic lines, wherein a pressure sensor is arranged or positioned downstream from the hydraulic pump in each of the two hydraulic lines and automatically transmits measurement signals generated by these hydraulic lines to the control device for the control device to automatically evaluate. This may be used to automatically adapt the controlling of the hydraulic motor to changing load requirements. Accordingly, responsive in the control device detecting a short-term increase in load demand, the control device may automatically control (e.g., via one or more commands) the displacement volume of the hydraulic motor to increase in order to increase the operating torque provided by the hydraulic motor. For this purpose, for example, the control device may operate the hydraulic motor in a boost mode.

In particular, the control device may be configured to adjust the displacement volume or the pivot angle (e.g., swivel angle) of the hydraulic motor to the specific attachment. This may make it possible to limit the maximum torque provided by the hydraulic motor for the particular attachment coupled to the feed device. This torque limitation may prevent overloading. The torque limitation may be overridden in boost mode. In particular, the control device may send one or more commands to override the torque limitation in boost mode (e.g., to change a value of the pivot angle of the hydraulic motor in order for the hydraulic motor to operate up to the attachment-specific maximum torque).

According to one or some embodiments, the control device may be configured to set and/or monitor a control current for adjusting the pivot angle of the hydraulic motor. One advantage of this may be that no additional components are required in the hydraulic circuit to set or adjust the pivot angle of the hydraulic motor.

Furthermore, a pressure relief valve may be arranged or positioned downstream from the hydraulic pump in each of the two hydraulic lines, wherein the two pressure relief valves may b of identical design. In particular, the pressure relief valves are designed as pilot-operated pressure relief valves. The closed hydraulic circuit with hydraulic pump and hydraulic motor may be limited in its maximum torque via the displacement volume and/or the pivot angle. The arrangement of the two identical pressure relief valves in the hydraulic lines may make it possible to set the maximum torque provided by the hydraulic motor in both directions of rotation to the same value or to different values in feed mode and in reversing mode. Accordingly, for the respective type of attachment, the maximum permissible torque may be automatically specified by the control device independently of the direction of rotation by setting the displacement volume and/or the pivot angle of the hydraulic motor.

In particular, the control device may comprise a computing unit, a memory unit, and an operating and display unit, wherein the computing unit may be configured to process information saved in the memory unit. The operating and display unit (which may comprise a touchscreen) may be configured to enter and/or manually or automatically select an attachment arranged or positioned on the feed device. Using the operating and display unit, an operator of the harvesting machine may select the corresponding attachment model so that the attachment-specific parameter set saved in the memory unit is available for processing by the computer unit (e.g., the computing unit, responsive to the operator input of the corresponding attachment model, may automatically access the attachment-specific parameter set correlated to the corresponding attachment model). Thus, in one way, the control device may determine the corresponding attachment model based on operator input. Alternatively, either the control device or another control device or unit of the harvester) may automatically recognize the attached attachment. Responsive to the automatic recognition (which may be based on automatic communication with the attachment), the control device may automatically select the attachment-specific parameter set (e.g., the computing unit, responsive to the automatic determination of the corresponding attachment model, may automatically access the attachment-specific parameter set correlated to the corresponding attachment model).

In one or some embodiments, at least one minimum value and/or at least one maximum value specific to the attachment for a load pressure detected in the hydraulic circuit may be saved in the memory unit. The minimum value and the maximum value specific to the attachment may form a transition range for switching between the operating modes of efficiency mode and boost mode.

In particular, the control device may be configured to automatically increase a displacement volume of the hydraulic motor by adjusting the pivot angle when the maximum value for the load pressure is exceeded. For this purpose, the control device may temporarily automatically operate the hydraulic motor in boost mode.

Furthermore, the control device may be configured to reduce the displacement volume of the hydraulic motor by automatically adjusting the pivot angle when the load pressure falls below the minimum value (e.g., responsive to the control device automatically detecting that the load pressure is below the minimum value, the control device automatically adjusts the pivot angle) so that the hydraulic motor generates the attachment-specific operating torque preset for the operating mode of the efficiency mode.

In one or some embodiments, the control device is configured to automatically control the hydraulic motor to change the assumed displacement volume depending on a minimum duration of exceeding the maximum value or falling below the minimum value (e.g., responsive to the control device automatically determining the minimum duration of exceeding the maximum value or falling below the minimum value, the control device automatically controls the hydraulic motor to change the assumed displacement volume).

In particular, the control device may determine the attachment-specific operating torque using characteristic curves or performance maps that may be saved in the memory unit or accessed by the computing unit. These may include efficiency maps from manufacturers of the hydraulic motor and load data from endurance tests.

In one or some embodiments, the control device may be configured to automatically operate a coupling device driven by the hydraulic motor and designed as a quick coupling device, to which the attachment is drive-connected for driving, at a constant speed of rotation for operating the attachment, and to automatically keep the speed of rotation of the coupling device constant or substantially constant (e.g., less than 5% deviation in value; less than 4% deviation in value; less than 3% deviation in value; less than 2% deviation in value; or less than 1% deviation in value) by automatically controlling the hydraulic pump of the attachment drive independent of the drive speed of the drive motor and the forward speed. While the hydraulic motor is operated at the preset pivot angle, the speed of rotation of the coupling device may be achieved by the actuation of the hydraulic pump. Within the technical limits, the speed of the coupling device may be kept substantially constant (e.g., less than 5% deviation in value; less than 4% deviation in value; less than 3% deviation in value; less than 2% deviation in value; or less than 1% deviation in value) independent of the drive motor speed and the advance speed. It may be essential that this control may counteract engine droop of a drive motor designed as an internal combustion engine in order to keep the speed of rotation of the coupling device basically constant. In this way, the operation may be ensured of attachments with driven components that are to be operated at a constant speed of rotation.

In this way, for example, the cutting pattern of a direct cutting unit may be improved by keeping the mowing disc speed of rotation substantially constant (e.g., less than 5% deviation in value; less than 4% deviation in value; less than 3% deviation in value; less than 2% deviation in value; or less than 1% deviation in value). By electrically controlling the pivot angle of the hydraulic motor, the hydrostatic transmission between the hydraulic pump and the hydraulic motor may counteract the engine droop to keep the speed of rotation of the coupling device constant or substantially constant (e.g., less than 5% deviation in value; less than 4% deviation in value; less than 3% deviation in value; less than 2% deviation in value; or less than 1% deviation in value).

Referring to the figures, FIG. 1 shows a schematic view of a self-propelled harvester 1 designed as a forage harvester 2. The harvester 1 is configured to harvest, collect, or pick up harvested material from a field using an attachment 4 in order to subsequently feed the collected crop material in the form of a harvested material flow 3 (indicated in FIG. 1 as a line provided with arrows) to downstream working units which are designed as processing and conveying units of the harvester 1, and to throw it using a transfer device into a loading container (not shown). The processing and conveying units of the harvester 1 which is designed as a forage harvester 2 include, inter alia, any one, any combination, or all of a feed device 5, a chopping device 6, an optional conditioning apparatus 7, and an ejection accelerator 8. The direction of travel is indicated by the arrow FR.

The feed device 5 comprises (or consists of) several driven roller pairs 5*a*, 5*b* arranged or positioned sequentially in a feed housing 5*c*. In one or some embodiments, the attachment 4 may be coupled to the feed device 5. The chopping device 6 includes a rotating cutter drum 6*a* equipped with blades through which the collected harvested material is comminuted in cooperation with a shear bar. The cutter drum 6*a* is arranged or positioned on a driven cutter drum shaft 6*b*. The optional conditioning apparatus 7 is arranged or positioned in a conveying shaft downstream from the chopping device 6 in the conveying direction of the stream from material and may be removed as needed from the harvested material flow 3 (alternatively termed a harvested material stream). The ejection accelerator 8 is downstream from the conditioning apparatus 7 in the conveying shaft in the conveying direction of the stream from material and accelerates the harvested material using rotating paddles for reliable ejection through the transfer apparatus 10, which may be designed as a discharge chute. In one or some embodiments, the ejection accelerator 8 includes conveying elements 8*a* arranged or positioned for conjoint rotation on a shaft 8*b*. A drive motor 9, which may be designed as an internal combustion engine, is arranged or positioned as a main drive assembly in the rear region of the forage harvester 2.

Different types of attachments may be used as an attachment 4, which may be coupled to the feed device 5, and which may be selected depending on the type of harvested material to be processed. For example, a so-called pickup may be used on the forage harvester 2 to collect harvested material deposited in windrows. To harvest entire plants, a disk mower may contrastingly be used. When harvesting corn, a corn header that works independent of rows, or a corn picker that works independent of rows may be coupled to the feed device 5 of the forage harvester 2. Other attachments are contemplated.

The aforementioned nonexclusive list of types of attachments 4 differ in terms of different operating specifications with respect to their drive. For example, the corn header or the pickup may require a variable rotational drive speed, whereas the disk mower may operate with a constant rotational drive speed. Moreover, the power consumption of the disc mower may be greater than that of the pickup or the corn header. Accordingly, the requirements for a drive provided for this purpose may vary.

Figure 2:
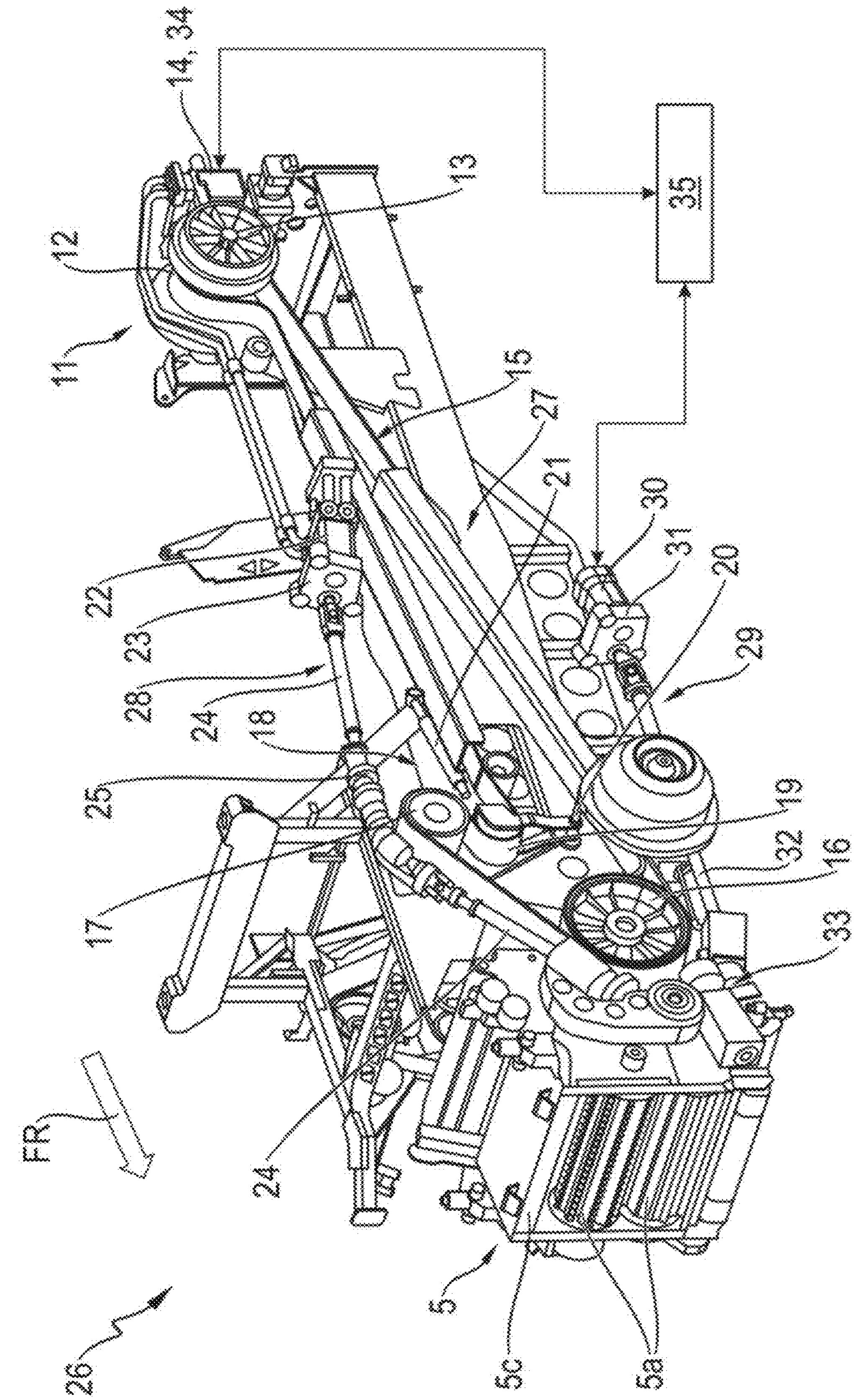
FIG. 2 illustrates an exemplary and schematic perspective view of a drive system of the forage harvester.

FIG. 2 illustrates an exemplary and schematic perspective view of a drive system 26 of the forage harvester 2. The schematic representation shows, in particular, the components of the drive system 26, which may serve to transmit power to the attached attachment 4 and the feed device 5.

In one or some embodiments, the drive motor 9 drives a transfer case 11 arranged or positioned on the left machine side using a motor shaft (not shown). The transfer case 11 may include an output pulley 12 that is arranged or positioned on a first driveshaft and may be shiftably connected by a hydraulically-actuatable coupling 13 to the motor shaft of the drive motor 9. Moreover, at least one hydraulic pump 14 may be connected directly to the transfer case 11 on a second drive shaft of the transfer case 11.

Using a main drive belt 15, at least one main pulley 16 arranged or positioned on the end of the cutter drum shaft 6*b* may be driven by the output pulley 12. The main drive belt 15 is configured to drive the ejection accelerator 8 by a pulley 17 arranged or positioned on a shaft. Adjustable tension may be applied to the top side of the main drive belt 15 by a tensioning device 18 that may include a belt tensioner 19 which may pivot about an axle 20, as well as a hydraulic cylinder 21. The output pulley 12, the main drive belt 15 and the main pulley 16 may form a main drivetrain 27 for driving any one, any combination, or all of the cutter drum 6*a*, the conditioning apparatus 7, and the ejection accelerator 8.

Furthermore, a hydraulic motor 22 may be arranged or positioned above the main drive belt 15. The hydraulic motor 22 may be driven by the at least one hydraulic pump 14. A driveshaft of the hydraulic motor 22 may drive a gearbox 23 that may be connected by prop shafts 24 to the feed device 5 to be driven. A gearbox 25 may also be arranged or positioned between the prop shafts 24. The hydraulic pump 14, the hydraulic motor 22, the gearbox 23 connected thereto, and the prop shafts 24 may form a separate drive train 28 to drive the feed device 5.

Another separate drive train, referred to as the attachment drive 29, is configured to drive the attachment 4. The attachment drive 29 may be arranged or positioned below the main drive belt 15. The attachment drive 29 comprises at least one hydraulic pump 34, which is configured to drive a hydraulic motor 30. Furthermore, the attachment drive 29 may comprise a transmission 31 connected to an output shaft of the hydraulic motor 30, and at least one cardan shaft 32 which is drivingly connected to a coupling device 33 for driving the attachment 4 arranged or positioned on the feed device 5. The coupling device 33 may be designed as a quick coupling device. The hydraulic motor 30 may be fed by the at least one hydraulic pump 34. The at least one hydraulic pump 34 of the attachment drive 29 may also be connected, such as directly, to the transfer case 11 for driving.

In one or some embodiments, the drive train 28 for driving the feed device 5 and the attachment drive 29 for driving the attachment 4 may be operated and controlled independently of one another.

In one or some embodiments, the hydraulic motor 30 is designed as a variable displacement motor. The hydraulic pump 34 may be designed as a variable displacement pump. A control device 35 may be configured to control one or both of the hydraulic motor 30 and the hydraulic pump 34 driving it. The control device 35 may be configured to specify a maximum displacement volume of the hydraulic motor 30. In one or some embodiments, the maximum displacement volume of the hydraulic motor 30 is preset depending on the type of attachment 4 which is received by the feed device 5. Accordingly, the maximum torque provided at the coupling device 33 may be specifically set or limited for different types of attachments 4 used on the forage harvester 2, for example a pick-up, corn header or direct cutting unit.

Figure 3:
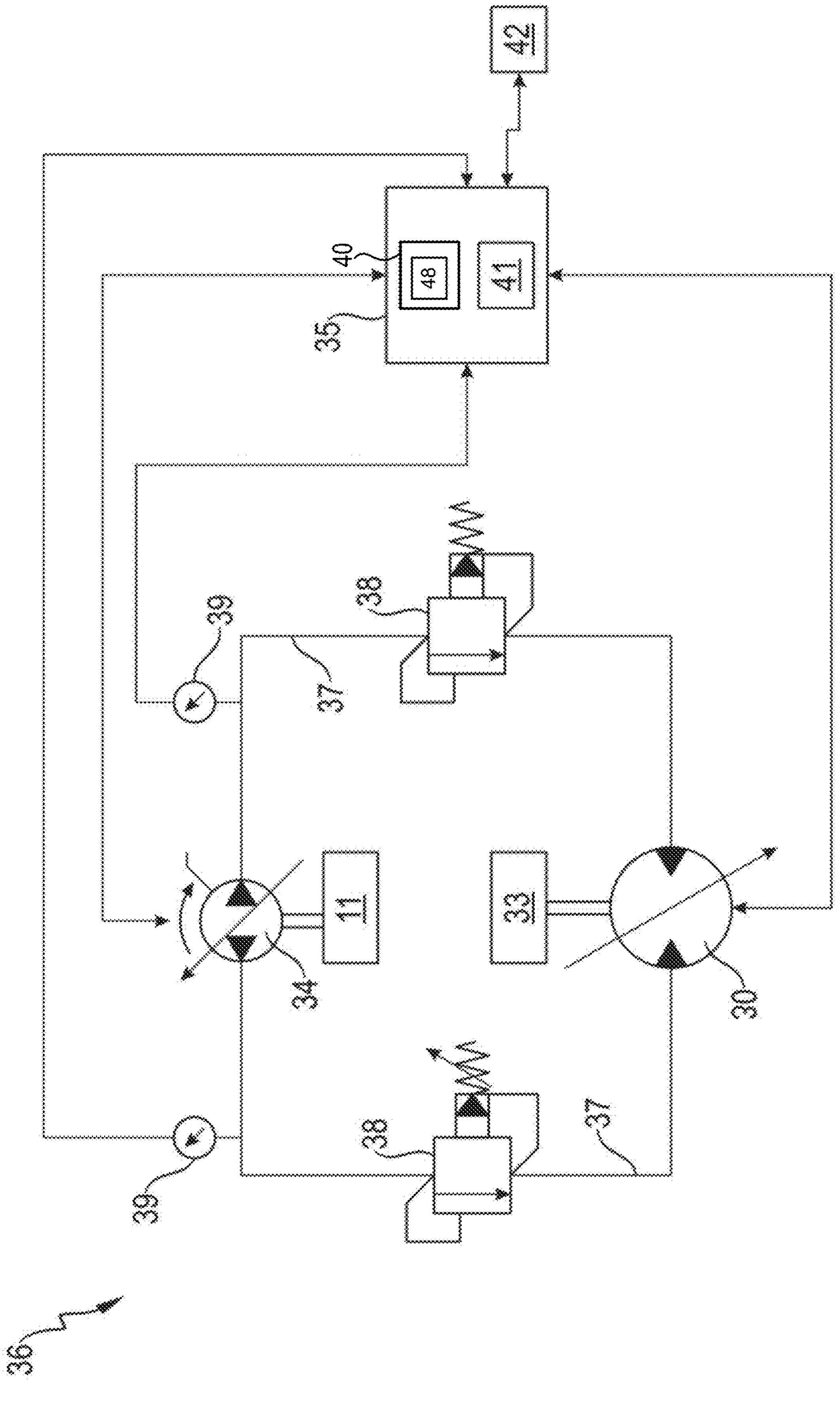
FIG. 3 illustrates a simplified circuit diagram of a hydraulic circuit of a drive train serving to drive the attachment.

The illustration in FIG. 3 shows an example of a highly simplified circuit diagram of a hydraulic circuit 36 of the attachment drive 29 serving to drive the attachment 4. The hydraulic motor 30 and the hydraulic pump 34 are arranged or positioned in the closed hydraulic circuit 36. Pressure relief valves 38 may be arranged or positioned in both hydraulic lines 37 which may connect the hydraulic motor 30 and the hydraulic pump 34 to one another in a fluid-conducting manner.

The attachment-specific presetting of the displacement volume of the hydraulic motor 30 by the control device 35 may make it possible to set a different torque for feeding the harvested material through the attachment 4 than for reversing. Thus, in one or some embodiments, the control device 35 is configured to set or limit the intake volume to a first value for feeding, and to a second value for reversing which may deviate from the first value.

Various types of computing functionality, including control device 35, are contemplated. For example, FIG. 3 illustrates control device 35, which may comprise a computing unit 40 and a memory unit 41, in communication with operating and display unit 42. In one or some embodiments, computing unit 40 may comprise any type of computing functionality, such as at least one processor 48 (which may comprise a microprocessor, controller, PLA, or the like). Similarly, the memory unit 41 may comprise any type of storage device (e.g., any type of memory). Though the computing unit 40 and the memory unit 41 are depicted as separate elements, they may be part of a single machine, which includes a microprocessor (or other type of controller) and a memory. Alternatively, the computing unit 40 may rely on memory unit 41 for all of its memory needs.

The computing unit 40 and memory unit 41 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

In one or some embodiments, the computing unit 40 is configured to process information saved in the memory unit 41. The operating and display unit 42, which may comprise a touchscreen, is configured for entry and/or manual or automated selection of the respective attachment 4 arranged or positioned on the feed device 5. The memory unit 41 may store attachment-specific parameter sets for the various types and models of attachments 4. The attachment-specific parameter sets include, among other things, maximum values for torques in feed mode and in reverse mode of the various types and models of attachments.

As an alternative to manual entry or selection of the attachment 4 arranged or positioned on the feed device 5, it is contemplated that automatic attachment recognition is provided to determine the nature and type of the coupled attachment 4. Merely by way of example, responsive to attaching the attachment 4 to the harvester 1, at least a part of the harvester 1, such as control device 35, may communicate (e.g., via wired and/or wireless communication) with the attachment 4 in order for the attachment 4 to send information indicative of the type of attachment (e.g., so that the control device 35 may automatically perform attachment recognition).

In one or some embodiments, the particular set of parameters specific to the attached attachment 4 is used, according to the entry or selection, by an operator to control the hydraulic motor 30 to set displacement volume or pivot angle SW of the hydraulic motor 30 to limit the torque to be transmitted to the attachment 4.

Furthermore, the operating and display unit 42 may be configured for manual entry of maximum values for torques in feed mode and in reverse mode of the attachment 4.

To limit the torque to be transmitted to the attachment 4, the control device 35 is configured to set and monitor a control current for setting the pivot angle SW of the hydraulic motor 30. For this purpose, the control current may be detected by a sensor assembly, and the measurement signals generated by the sensor assembly may be transmitted (e.g., wired and/or wirelessly) to the control device 35 for evaluation.

In one or some embodiments, the pressure relief valves 38 are arranged or positioned downstream from the hydraulic pump 34. In one or some embodiments, the two pressure relief valves 38 are used and are of identical design so that the maximum attachment-specific torque that is provided at the coupling device 33 is the same regardless of the direction of rotation. In this case, "of identical design" may mean that the two pressure relief valves 38 have identical specifications. A pressure sensor 39 may be assigned to each of the hydraulic lines 37 and may transmit measurement signals generated by them to the control device 35 for evaluation.

The arrangement of the two identical pressure relief valves 38 in the hydraulic circuit 36 also allows the hydraulic motor 30 to be operated at full capacity in both directions of rotation (e.g., in feed mode and in reverse mode).

The control device 35 may also be configured to specify and set identical setting values or setting values differing from one another for the displacement volume or the pivot angle SW in the feed mode and in the reverse mode. In conjunction with the identical two pressure relief valves 38, this may make it possible to harmonize the requirements of the different attachments 4 which may prevent overloading of the components of the respective attachment 4 and of the attachment drive 29.

In one or some embodiments, the attachment drive 29 may be configured to drive the attachment 4 with counter-clockwise rotation and clockwise rotation in feed mode.

In one or some embodiments, the direction of rotation at the coupling device 33 may be reversed by inverted control of the hydraulic pump 34. The inverted control of the hydraulic pump 34 may also be performed by the control device 35. With inverted control, the control device 35 may control the hydraulic pump 34 in such a way that the direction of rotation of the attachment drive 29 changes from counterclockwise to clockwise or vice versa. The same maximum rotational speeds may be set in both directions of rotation; accordingly, both attachments 4 with a counter-clockwise rotation for feed mode and attachments 4 with a clockwise rotation for feed mode may be coupled to the attachment drive 29 of the harvester 1 without additional speed-change gearboxes, or at least with a reduced number of speed-change gearboxes.

In conjunction with the two identical pressure relief valves 38 in the closed hydraulic circuit 36, the respective set torque for feed mode and reverse mode may be available at the coupling device 33, irrespective of the direction of rotation.

Figure 4:
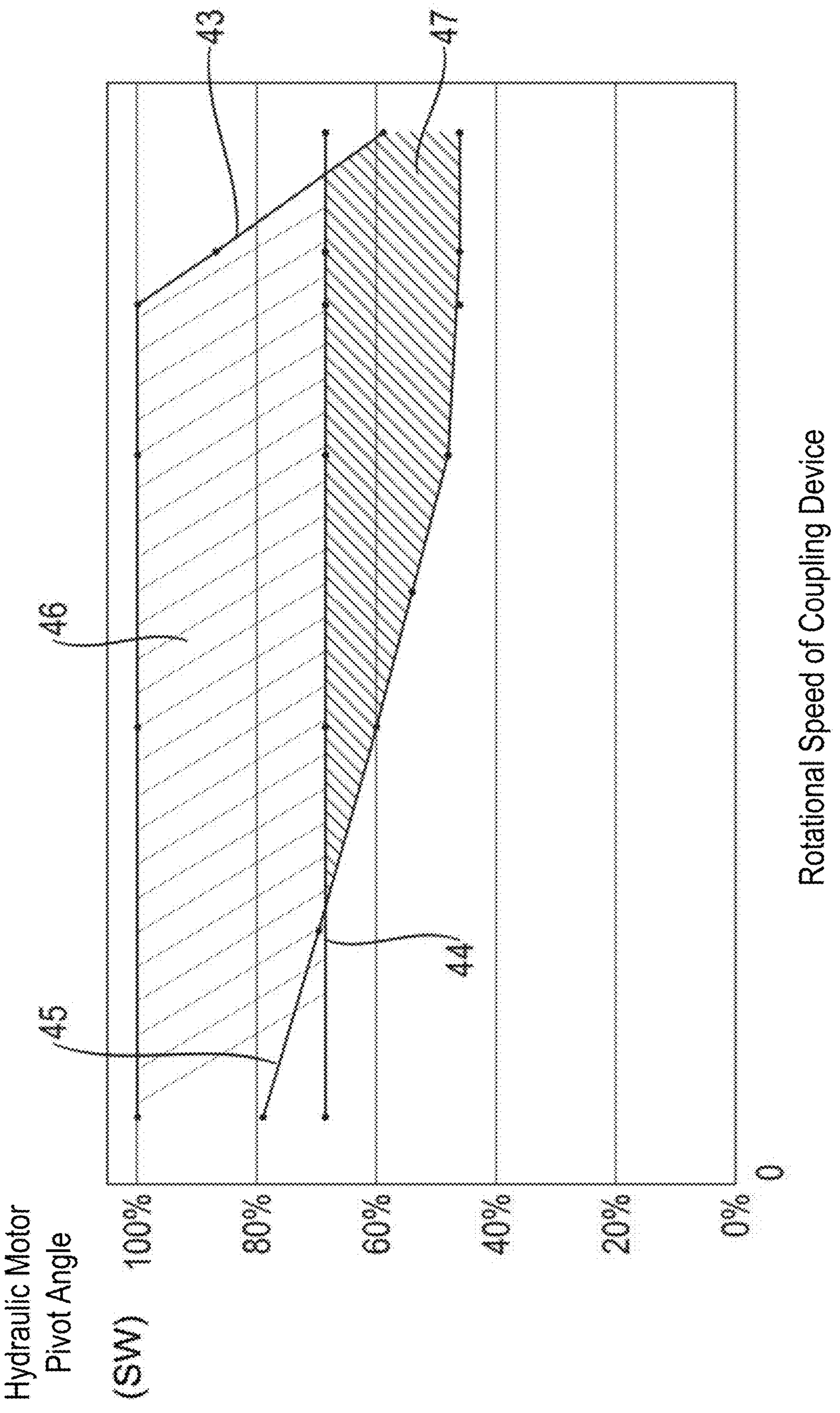
FIG. 4 illustrates a pivot angle speed diagram.

FIG. 4 shows a pivot angle speed diagram with different torque curves 43, 44, 45 for the hydraulic motor 30 and the attachment 4. Element 43 indicates a limit torque curve of the hydraulic motor 30, which may represent its technical upper limit—the maximum torque that may be provided by the hydraulic motor 30. Element 44 indicates a torque curve of the attachment 4 to be driven, which results for the specific attachment from the maximum torque that may be absorbed by the attachment 4. Element 45 indicates an efficiency torque curve of the hydraulic motor 30, which may be set for different load points of the attachment 4, in which the hydraulic motor 30 may be operated efficiently.

In one or some embodiments, the control device 35 is configured to operate the hydraulic motor 30 in an efficiency mode, wherein the control device 35 determines the pivoting angle SW of the hydraulic motor 30 preset in the efficiency mode according to a load spectrum depending on the type of mounted attachment 4 and an operating speed specific to the attachment 4. In efficiency mode, the hydraulic motor 30 may be operated at an efficient operating point depending on the attachment to be driven. The efficient operating point may be determined based on the efficiency torque curve 45 of the hydraulic motor 30.

A range marked by hatching 46 between the limit torque curve 43 of the hydraulic motor 30 and the torque curve 44 of the attachment 4 may define the operating range of the hydraulic motor 30 within which it cannot be operated due to the limit torque curve 44 of the attachment 4 to be driven. Compliance with the limit torque curve 44 may be achieved by controlling and setting the two identical pressure relief valves 38. In this regard, the control device 35 may command the setting of the two identical pressure relief valves 38 in order to operate in the defined operating range.

A range marked by hatching 47 between the limit torque curve 44 of the attachment 4 and the efficiency torque curve 45 of the hydraulic motor 30 may define a permissible operating range of the hydraulic motor 30 in which an override of the efficiency torque curve 45 is permissible by means of an adjustment of the pivot angle SW by controlling by the control device 35. Likewise, the control device 35 may command the setting of the two identical pressure relief valves 38 in order to operate in the defined operating range.

As explained above, the control device 35 is configured to control the hydraulic motor 30 to set the displacement volume or the pivot angle SW to limit a torque to be transmitted to the attachment 4. For this purpose, the pivot angle SW to be set may be determined based on the efficiency torque curve 45 specific to the particular attachment 4. The control device 35 sets the corresponding control current to set the pivot angle SW derived from the efficiency torque curve 45 for operation in the efficiency mode.

The control device 35 may accordingly be configured to control the hydraulic motor 30 depending on a set of attachment-specific parameters saved in the control device 35 so that the hydraulic motor 30 generates an attachment-specific operating torque in efficiency mode, which may be lower than a maximum torque specific to the attachment 4 to be driven. The attachment-specific maximum torque may be correspondingly determined by the control device 35 from the limit torque curve 44 of the attachment 4. The attachment-specific operating torque may be correspondingly determined by the control device 35 from the efficiency torque curve 45 of the attachment 4.

Furthermore, the control device 35 may be configured to control the hydraulic motor 30 when a load peak is detected so that the hydraulic motor 30 increases the generated operating torque up to the maximum torque. This may make it possible to respond to short-term increased load requirements of the attachment 4. In this regard, this may be used to adapt the controlling of the hydraulic motor 30 to changing load requirements. Accordingly, in the event of a short-term increase in load demand, the displacement volume of the hydraulic motor 30 may be increased in order to increase the operating torque provided by the hydraulic motor 30. For this purpose, the control device 35 may operate the hydraulic motor 30 in a boost mode. Thus, the control device may determine various conditions, and may automatically change the mode accordingly (e.g., responsive to the control device 35 detecting a load peak, the control device 35 may control the hydraulic motor 30 in order to increase the generated operating torque up to the maximum torque for the specific load requirements of the particular attachment 4, thereby effectively having the control device 35 transition the hydraulic motor 30 into the boost mode; conversely, responsive to the control device 35 detecting a decrease in load demand, the control device 35 may control the hydraulic motor 30 in order to decrease the generated operating torque to be lower than the maximum torque specific to the attachment 4, thereby effectively having the control device 35 transition the hydraulic motor 30 into the efficiency mode).

In one or some embodiments, the pressure sensor downstream from the hydraulic pump in each of the two hydraulic lines may be used to detect load peaks, and the measuring signals generated thereby may be transmitted to the control device for evaluation (e.g., the control device 35 may automatically receive the measuring signals and compare the measuring signals with predetermined values to determine whether the load peaks are detected; responsive to the control device 35 detecting the load peaks, the control device 35 may control the hydraulic motor 30 to transition the hydraulic motor 30 into the boost mode). An attachment-specific minimum value and a maximum value for a detected load pressure in the hydraulic circuit 36 may be saved in the memory unit 41. In this way, the control device 35 may compare the detected load pressure with the respective saved minimum and maximum values by the computing unit 40 of the control device 35 in order to detect the load peaks.

In one or some embodiments, the control device 35 is configured to increase a displacement volume of the hydraulic motor 30 by adjusting the pivot angle SW when the maximum value for the detected load pressure is exceeded (e.g., detecting a load peak). The pivot angle SW may correspondingly be adjusted until the limit torque curve 44 of the attachment 4 is reached. The pivot angle SW may be adjusted in steps. A stepless adjustment of the pivot angle SW is also contemplated.

If the value falls below the minimum value, the control device 35 may control the hydraulic motor 30 to reduce the displacement of the hydraulic motor 30 to a value by adjusting the pivot angle SW so that the hydraulic motor 30 is reduced to the set attachment-specific operating torque generated corresponding to the efficiency torque curve 45 determined for the attachment. In this way, the control device 35 may, responsive to detecting a non-peak load, control the hydraulic motor 30 to operate in efficiency mode.

The control device 35 may be configured to control the hydraulic motor 30 to change the assumed displacement volume depending on a minimum duration of exceeding the maximum value or falling below the minimum value. In this way, an unintentional oscillation of the system may be avoided (e.g., excessively transitioning between boost mode and efficiency mode).

At least one minimum value and at least one maximum value specific to the attachment for a load pressure detected in the hydraulic circuit 36 may be saved in the memory unit 41. The minimum value and the maximum value specific to the attachment 4 may form a transition range for switching between the operating modes of efficiency mode and boost mode. In this regard, the control device 35 may tailor its analysis of whether to transition to the boost mode and/or transition to the efficiency mode based on the specific attachment by using the minimum value and the maximum value specific to the attachment 4.

According to another aspect, the control device 35 may be configured to operate a coupling device driven by the hydraulic motor 30 and designed as a quick coupling device 33, to which the attachment 4 is drive-connected for driving, at a constant speed of rotation for operating the attachment 4, and to keep the speed of rotation of the coupling device 33 basically constant by controlling the hydraulic pump 14 of the attachment drive 29 independently of the drive speed of the drive motor 9 and the forward speed.

While the hydraulic motor 30 is operated at the preset pivot angle SW, the speed of rotation of the coupling device 33 may be achieved by the actuation of the hydraulic pump 34. Within the technical limits, the speed of the coupling device 33 may be kept substantially constant (e.g., less than 5% deviation in value; less than 4% deviation in value; less than 3% deviation in value; less than 2% deviation in value; or less than 1% deviation in value) independent of the drive motor speed and the advance speed. It may be key that this control may counteract engine droop of the drive motor 9 designed as an internal combustion engine in order to keep the speed of rotation of the coupling device 33 substantially constant (e.g., less than 5% deviation in value; less than 4% deviation in value; less than 3% deviation in value; less than 2% deviation in value; or less than 1% deviation in value). In this way, the operation may be ensured of attachments 4 with driven components that are to be operated at a constant speed of rotation.

In this way, for example, the cutting pattern of a direct cutting unit may be improved by keeping the mowing disc speed of rotation basically constant. By electrically controlling the pivot angle SW of the hydraulic motor 30, the hydrostatic transmission between the hydraulic pump 34 and the hydraulic motor 30 may counteract the engine droop to keep the speed of rotation of the coupling device 33 substantially constant.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Harvester
2 Forage harvester
3 Harvested material flow
4 Attachment
5 Feed device
5*a* Roller
5*b* Roller
5*c* Feed housing
6 Chopping device
6*a* Cutter drum
6*b* Cutter drum shaft
7 Conditioning apparatus
8 Ejection accelerator
8*a* Conveyor element
8*b* Shaft
9 Drive motor
10 Transfer device
11 Transfer case
12 Output pulley
13 Coupling
14 Hydraulic pump
15 Main drive belt
16 Main pulley
17 Pulley
18 Tensioning device
19 Belt tensioner
20 Axle
21 Hydraulic cylinder
22 Hydraulic motor
23 Gearbox
24 Prop shaft
25 Gearbox
26 Drive train
27 Main drivetrain
28 Drive train
29 Attachment drive
30 Hydraulic motor
31 Gearbox
32 Prop shaft
33 Coupling device
34 Hydraulic pump
35 Control device
36 Hydraulic circuit
37 Hydraulic line
38 Pressure relief valve
39 Pressure sensor
40 Computing unit
41 Memory unit
42 Operating and display unit
43 Limit torque curve of 30
44 Torque curve of 4
45 Efficiency torque curve
46 Hatching
47 Hatching
48 Processor
FR Driving direction
SW Pivot angle of hydraulic motor

The invention claimed is:

1. A self-propelled harvester comprising:

a drive motor;

an attachment drive including at least one hydraulic motor designed as a variable displacement motor and at least one hydraulic pump configured to drive the at least one hydraulic motor, the at least one hydraulic pump and the at least one hydraulic motor are arranged in a closed hydraulic circuit, the at least one hydraulic pump and the at least one hydraulic motor are connected to one another in a fluid-conducting manner by at least two hydraulic lines, the at least one hydraulic motor configured to drive an attachment positioned on a feed device of the harvester;

a pressure sensor positioned downstream from the at least one hydraulic pump in each of the at least two hydraulic lines and configured to automatically transmit measurement signals indicative of pressure in the at least two hydraulic lines; and a control device configured to:

responsive to detecting a particular attachment connected to the harvester, access an attachment-specific parameter set including a respective torque curve, selected from a plurality of torque curves, based on the particular attachment;

control the at least one hydraulic motor depending on the attachment-specific parameter set so that the at least one hydraulic motor generates an attachment-specific operating torque which is lower than an attachment-specific maximum torque that is specific to the particular attachment to be driven; and responsive to detecting a load peak, control, based on the respective torque curve that is selected based on the particular attachment, the at least one hydraulic motor in order to increase the operating torque generated by the at least one hydraulic motor up to the attachment-specific maximum torque by changing a value of a pivot angle of the at least one hydraulic motor in order for the at least one hydraulic motor to operate up to the attachment-specific maximum torque.

2. The harvester of claim 1, wherein the attachment-specific parameter set comprises a load spectrum that is dependent on a type of the particular attachment connected to the harvester and an operating speed specific to the particular attachment connected to the harvester; and wherein the control device is configured to automatically operate in one of a plurality of modes responsive to automatically detecting at least one operation aspect of the harvester.

3. The harvester of claim 2, wherein the control device is configured to automatically determine to operate in one of an efficiency mode or a boost mode; and wherein responsive to detecting the load peak, the control device is configured to switch from operating in the efficiency mode to the boost mode.

4. The harvester of claim 3, wherein, responsive to detecting the load peak, the control device is configured to switch from operating in the efficiency mode to the boost mode by changing a value of a pivot angle of the at least one hydraulic motor; and wherein, responsive to determining to operate in the efficiency mode, the control device is configured to determine the value of the pivot angle of the at least one hydraulic motor to a preset for the efficiency mode based on the load spectrum and operating speed of the attachment.

5. The harvester of claim 4, wherein the control device is configured to automatically evaluate the measurement signals in order to determine whether to switch from operating in the efficiency mode to the boost mode.

6. The harvester of claim 5, further comprising a respective pressure relief valve positioned downstream from the at least one hydraulic pump in each of the at least two hydraulic lines;

wherein the respective pressure relief valves are of identical design; and wherein the control device is configured to set one or more values for the respective pressure relief valves in order for the harvester to operate in one of the efficiency mode to the boost mode.

7. The harvester of claim 1, wherein the control device is configured to determine whether the load peak is detected based on the attachment-specific parameter set;

wherein the attachment-specific parameter set comprises a maximum value specific to the attachment for a load pressure; and wherein the control device is configured to compare a value of a load pressure with the maximum value specific to the attachment in order to detect the peak load.

8. The harvester of claim 7, wherein, responsive to the control device detecting the peak load, the control device is configured to increase a displacement volume of the at least one hydraulic motor; and wherein, responsive to the control device determining that the value of the load pressure equals or exceeds the maximum value specific to the attachment, the control device is configured to increase a displacement volume of the at least one hydraulic motor by adjusting a value of a pivot angle.

9. The harvester of claim 8, wherein the control device is further configured to compare the value of the load pressure with a minimum value for the load pressure specific to the attachment in order to determine whether to modify operation of the harvester; and wherein, responsive to the control device determining that the value of the load pressure equals or is less than the minimum value specific to the attachment, the control device is configured to reduce the displacement volume of the at least one hydraulic motor by adjusting the pivot angle so that the at least one hydraulic motor generates the attachment-specific operating torque preset for operating in an efficiency mode.

10. The harvester of claim 9, wherein the control device is configured to control the at least one hydraulic motor to change the displacement volume depending on at least a minimum duration of exceeding the maximum value or being less than the minimum value.

11. The harvester of claim 7, wherein the control device is configured to determine attachment-specific operating torque using characteristic curves that are included in the attachment-specific parameter set.

12. The self-propelled harvester of claim 1, wherein the control device is configured to operate a coupling device driven by the at least one hydraulic motor and designed as a quick coupling device, to which the attachment is drive-connected for driving;

wherein the control device is configured to maintain a speed of rotation of the coupling device at a substantially constant speed in at least one of an efficiency mode or a boost mode;

wherein the control device is configured to maintain the speed of rotation of the coupling device at the substantially constant speed by controlling the at least one hydraulic pump of the attachment drive independently of drive speed of the drive motor and forward speed of the harvester.

13. The harvester of claim 12, wherein the harvester is configured to connect with a plurality of attachments;

wherein each of the plurality of attachments has a corresponding respective attachment-specific parameter set;

wherein the control device is configured to access the respective attachment-specific parameter set responsive to determining a respective attachment that is connected to the harvester;

wherein the control device is configured to control the respective attachment according to the respective attachment-specific parameter set accessed in order to operate at an efficient operating point; and wherein the control device is configured to determine the efficient operating point based on an efficiency torque curve specific to the respective attachment.

14. The self-propelled harvester of claim 1, wherein the control device is further configured to perform inverted control of the at least one hydraulic pump.

15. The self-propelled harvester of claim 14, wherein the control device is configured to perform the inverted control of the at least one hydraulic pump by controlling reversing a direction of the attachment drive from counterclockwise to clockwise or vice versa.

16. The self-propelled harvester of claim 15, wherein same maximum rotational speeds are set in both directions of rotations so that the particular attachment operating counterclockwise for feed mode and the particular attachment operating clockwise for feed mode of a coupling device, which is driven by the at least one hydraulic motor, is coupled to the attachment drive without any additional speed-change gearboxes.

17. The self-propelled harvester of claim 6, wherein the harvester comprises a forage harvester; and wherein the control device is configured to comply with the respective torque curve by controlling and setting the respective pressure relief valves in each of the at least two hydraulic lines.

18. The self-propelled harvester of claim 17, wherein the control device is configured to command the setting of the respective pressure relief valves in each of the at least two hydraulic lines in order to operate in a defined operating range based on the respective torque curve.

19. The self-propelled harvester of claim 18, wherein the control device is configured control operation to be between a limit torque curve and an efficiency torque curve of the at least one hydraulic motor; and wherein the control device is configured to control the operation to override the efficiency torque curve by controlling adjustment of the pivot angle.

20. The self-propelled harvester of claim 18, wherein the control device is further configured to:

access at least one minimum value and at least one maximum value specific to the particular attachment that form a transition range for switching between operating modes of efficiency mode and boost mode;

determine whether to transition to the boost mode or to transition to the efficiency mode based on the particular attachment; and transition to the boost mode or the efficiency mode based on the at least one minimum value and the at least one maximum value.

* * * * *